US008682785B2

(12) United States Patent
Ghosh et al.

(10) Patent No.: US 8,682,785 B2
(45) Date of Patent: Mar. 25, 2014

(54) BANK CARD AUTHORIZATION WITH BALANCE INDICATOR

(75) Inventors: Debashis Ghosh, Charlotte, NC (US); David Joa, Pacifica, CA (US); Kurt D. Newman, Matthews, NC (US); Thayer Allison, Charlotte, NC (US); Sudeshna Banerjee, Waxhaw, NC (US); Mark V. Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 699 days.

(21) Appl. No.: 12/261,970

(22) Filed: Oct. 30, 2008

(65) Prior Publication Data

US 2010/0114724 A1     May 6, 2010

(51) Int. Cl.
*G06F 21/00*     (2013.01)
*G06Q 20/10*     (2012.01)

(52) U.S. Cl.
CPC .................................... *G06Q 20/10* (2013.01)
USPC ............................................... 705/39; 705/17

(58) Field of Classification Search
CPC .................................................. G06Q 20/204
USPC ........................................................ 705/17, 39
See application file for complete search history.

(56) References Cited

U.S. PATENT DOCUMENTS

| 6,032,859 | A | 3/2000 | Muehlberger et al. |
| 6,999,943 | B1 * | 2/2006 | Johnson et al. ................ 705/39 |
| 7,117,172 | B1 * | 10/2006 | Black ............................... 705/30 |
| 8,280,786 | B1 * | 10/2012 | Weiss et al. ..................... 705/17 |
| 2004/0010457 | A1 * | 1/2004 | Kakuta ............................ 705/33 |
| 2004/0205011 | A1 * | 10/2004 | Northington et al. .......... 705/35 |
| 2005/0080728 | A1 | 4/2005 | Sobek |
| 2007/0119923 | A1 * | 5/2007 | Garrison et al. ............. 235/380 |
| 2008/0005264 | A1 * | 1/2008 | Brunell et al. ................ 709/217 |
| 2008/0167000 | A1 * | 7/2008 | Wentker et al. ............... 455/408 |
| 2008/0208681 | A1 | 8/2008 | Hammad et al. |

OTHER PUBLICATIONS

International Search Report and Written Opinion of the International Searching Authority mailed Dec. 22, 2009 for International Application No. PCT/US2009/062647.

\* cited by examiner

*Primary Examiner* — Ryan Zeender
*Assistant Examiner* — Hunter Wilder
(74) *Attorney, Agent, or Firm* — Michael A. Springs; Moore and Van Allen, PLLC; Patrick B. Horne (57) ABSTRACT

Systems, methods, and computer program products are provided for providing a consumer with information about the balance of the consumer's credit or debit account after a transaction, such as a purchase transaction, is made using the credit or debit account. In one embodiment, the issuing bank attaches a number representing the balance of the consumer's credit or debit account and/or other information about the balance to the authorization code when authorizing a purchase transaction so that, when a vendor provides the consumer with a purchase receipt that has the authorization code on the receipt, the balance information is automatically included on the receipt with the authorization code. In this way, the consumer can keep track of spending by knowing the total balance of the consumer's credit and/or debit account and/or other balance information after each credit or debit card purchase.

31 Claims, 7 Drawing Sheets

BANK CARD AUTHORIZATION WITH BALANCE INDICATOR

FIELD

In general, embodiments of the invention relate to consumer credit or debit accounts, and, more particularly, relate to systems, methods, and computer program products for providing a bank card holder with an indication of the bank card holder's account balance when the bank card holder enters into a transaction using the bank card.

BACKGROUND

Bank cards, including credit and debit cards, are the primary method consumers use to pay for goods and services when engaged in point-of-sale (POS) and online transactions. In fact, many consumers will make numerous bank card transactions throughout the day, such transactions including purchases, returns, deposits, withdrawals, purchases with cash back, etc. A consumer can easily lose track of how much the consumer has spent and how much the consumer has left in the credit or debit account to spend. Currently, a consumer interested in knowing his or her account balance must either call the card-issuing bank to inquire about the balance, or log into the card-issuing bank's website. Both of these methods for obtaining one's balance are cumbersome and time-consuming. As such, there is a desire for improved systems, methods, and/or computer program products to assist a consumer with tracking the balance in the consumer's credit or debit account balance.

SUMMARY

Systems, methods, and computer program products are provided for providing a consumer with information about the balance of the consumer's credit or debit account after a transaction, such as a purchase transaction, is made using the credit or debit account. In one embodiment, the issuing bank attaches a number representing the balance of the consumer's credit or debit account and/or other information about the balance to the authorization code when authorizing a purchase transaction so that, when a vendor provides the consumer with a purchase receipt that has the authorization code on the receipt, the balance information is automatically included on the receipt with the authorization code. In this way, the consumer can keep track of spending by knowing the total balance of the consumer's credit and/or debit account and/or other balance information after each credit or debit card purchase.

For example, embodiments of the present invention provide a method involving: (1) receiving an authorization request comprising a request to authorize a transaction involving a bank account; and (2) responding to the authorization request with an authorization communication comprising a balance indicator. In one embodiment, the method is performed by an issuing bank that maintains the bank account. In one embodiment, the transaction comprises a purchase of goods or services where payment for the goods or services is to come from the bank account. In one embodiment, the bank account comprises a credit account or a debit account. In one embodiment, the balance indicator comprises a number representing the funds available in the bank account before or after the transaction occurs.

In one embodiment, where the bank account comprises a credit account, the balance indicator comprises a number representing the balance of the credit account. In another embodiment, in addition to or as an alternative to the current balance of the credit account, the balance indicator comprises a number representing the available credit balance in the credit account.

In one embodiment, the authorization communication comprises an authorization code. In one such embodiment, the balance indicator is attached to the authorization code, such as the end of the authorization code. In one embodiment, the balance indicator is combined with the authorization code in such a way that a point-of-sale terminal configured to automatically display an authorization code will automatically display the balance indicator with the authorization code. For example, in one embodiment, the point-of-sale terminal is configured to automatically display an authorization code on a printed receipt and would, therefore, also print the attached balance indicator on the receipt.

In one embodiment, the balance indicator comprises balance information disguised by a rule selected by a person associated with the bank account. In one embodiment, the balance indicator comprises a code attached to balance information, said code signaling to a user the presence of or type of balance information.

Some embodiments of the method further involve receiving an indication from a person associated with the bank account that the issuing bank should communicate a balance indicator with the authorization communication. In some embodiments, the balance indicator comprises a cycle-to-date purchase balance, a period-to-date purchase balance, or a purchase category balance, and, in some instances, the consumer/account holder can choose the balance indicator(s) to have sent in response to an authorization request.

Embodiments of the present invention also provide method involving: (1) communicating account information and transaction information to a financial institution, wherein said account information comprises information about a consumer's credit or debit account to be used during a purchase of a good or service, and wherein said transaction information comprising information about the purchase; and (2) receiving a balance indicator from the financial institution, wherein said balance indicator comprises information about the credit or debit account's balance. The method may further involve presenting the balance indicator to the consumer, which, in one embodiment, involves printing the balance indicator on the consumer's receipt. The method may further involve receiving the account information from the consumer's payment device, such as a credit or debit card. In one embodiment, receiving the balance indicator from the financial institution comprises receiving a balance indicator in response to an authorization request, said authorization request requesting the financial institution's approval of the purchase. In one embodiment, receiving the balance indicator comprises receiving an authorization code, which, in some instances, is attached to the balance indicator. The method may involve presenting the balance indicator to the consumer as part of the authorization code. The method may involve asking the consumer is the consumer would like to receive a balance indicator. In one embodiment, this method is performed by a point of sale terminal.

Embodiments of the invention also provide a system having a communication device and a processing device. The communication device is configured to receive an authorization request, said authorization request comprising a request to authorize a purchase involving a credit or debit account. The processing device is operatively coupled to the communication device and configured to use the communication device to respond to the authorization request with an authorization communication, said authorization communication comprising an indication of the credit or debit account's balance.

In one embodiment of the system, the authorization communication comprises an authorization code in addition to the indication of the credit or debit account's balance. In some instances, the authorization communication comprises an authorization code, where the authorization code comprises, and in some instances is attached to, the indication of the credit or debit account's balance.

In one embodiment of the system, the indication of the credit or debit account balance is disguised based on a rule. In this regard, one embodiment of the system includes a user input system configured to receive user input from a user, wherein the rule is based at least partially on user input, and wherein the user is associated with the credit or debit account.

In one embodiment, a user input system is configured to receive an indication from a user regarding whether the user desires to receive the indication of the credit or debit account's balance. In another embodiment, the authorization request includes an indication regarding whether the user desires to receive the indication of the credit or debit account's balance.

In one embodiment of the system, the authorization request comprises an information about a vendor or a product involved in the purchase, and the indication of the credit or debit account's balance comprises a category-specific balance. In such an embodiment, the category-specific balance may provides a balance of purchases made during a period of time in a certain category, where the category is at least partially based on the information about the vendor or the product involved in the purchase.

Embodiments of the invention also provide a computer program product comprising a computer-readable medium, where the computer-readable medium comprises computer-readable instructions. The computer-readable instructions include: (1) instructions for receiving an authorization request comprising a request to authorize a transaction involving a bank account; and (2) instructions for responding to the authorization request with an authorization communication comprising a balance indicator. The computer program product may also include instruction for disguising balance information in the balance indicator by applying a rule selected by a person associated with the bank account, and/or other instructions for performing other functions described herein.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
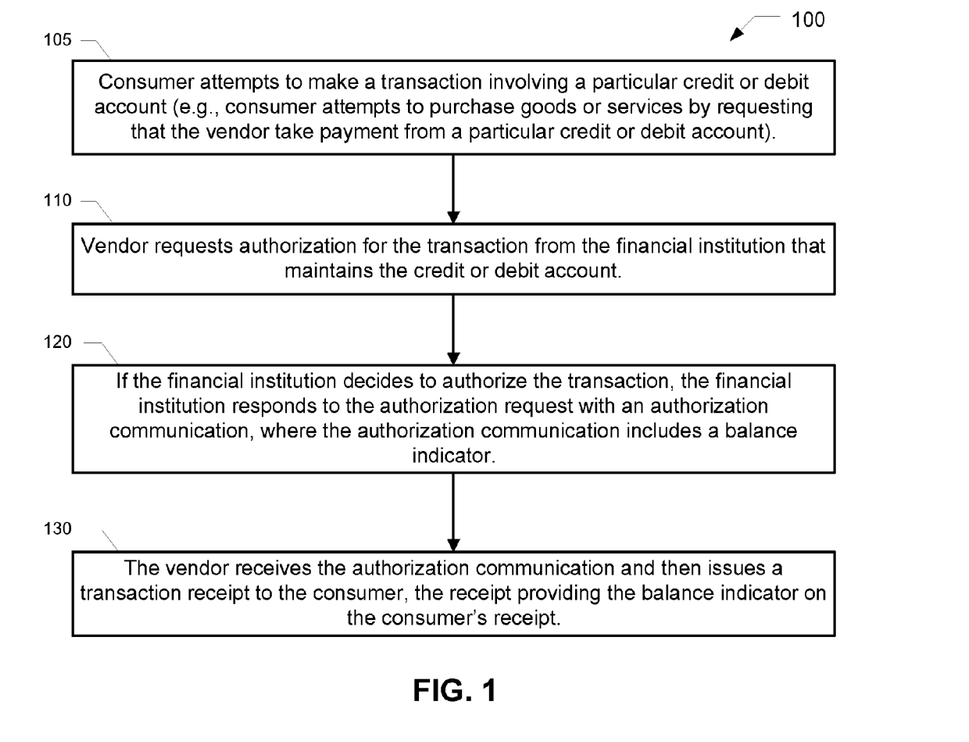
FIG. 1 is a flow diagram illustrating a balance indication process, in accordance with one embodiment of the present invention.

FIG. 1 is a flow diagram illustrating a balance indication process 100 in accordance with one embodiment of the present invention. As represented by block 105, a consumer attempts to make a transaction involving a particular credit or debit account. For example, the consumer may attempt to purchase a good or service from a vendor by requesting that the vendor take payment from a particular credit or debit account. In one embodiment, a consumer provides the vendor with a credit card or a debit card, which provides the vendor with information about a particular credit or debit account from which the vendor can obtain payment. As used herein, a "bank card" refers to a credit card, a debit card, or the like, and a "bank account" refers to a credit account, a debit/deposit account, or the like. Although the phrases "bank card" and "bank account" include the term "bank," the card need not be issued by a bank and the account need not be maintained by a bank and may, instead, be issued by and/or maintained by other financial institutions. As used herein, unless specifically limited by the context, a "transaction" may refer to a purchase of goods or services, a return of goods or services, a payment transaction, a credit transaction, or other transaction involving the consumer's bank account. As used herein, the term "products" refers to both goods and services.

As represented by block 110, the vendor uses the account information provided by the consumer to contact, directly or indirectly, the financial institution that maintains the consumer's bank account and to request authorization for the transaction. For example, the vendor may send an authorization request to the vendor's bank which may then use one or more financial networks to send the authorization request to the issuing bank that issued the consumer's bank card.

As represented by block 120, if the financial institution that maintains the consumer's bank account decides to authorize the transaction, the financial institution responds to the authorization request with an authentication communication that includes a balance indicator, the balance indicator providing information about the balance of the consumer's bank account. For example, where the transaction is a purchase transaction, the issuing bank that issued the consumer's bank card may compare the purchase amount received in the authorization request to the available funds in the consumer's debit account or the available credit in the consumer's credit account, as the case may be, and then authorize the purchase transaction if there are sufficient funds/credit available in the consumer's account. The issuing bank may then communicate its authorization to the vendor by sending an authorization code, such as an authorization number, to the vendor via the acquiring bank and/or one or more financial networks. In one embodiment of the invention, the balance indicator comprises a number representing the dollar amount of the credit or debit account's total balance and/or available credit, and the issuing bank attaches this number to the authorization code that is sent to the vendor. As described in greater detail below, in some embodiments, in addition to or as an alternative to the actual total account balance, the balance indicator includes information about the account balance, such as "sub-balances" like the balance of purchases made since the last statement or over some other defined period of time, the balance of purchases made in a certain type of category of goods or services, the balance of purchases made from the current vendor or type of vendor, etc.

As represented by block 130, the vendor receives the authorization communication and then issues a transaction receipt, such as a purchase receipt, to the consumer. The transaction receipt includes the balance indicator thereon so that the consumer can view the consumer's account balance and/or other balance information each time the consumer makes a transaction using the account and receives a receipt for the transaction.

Figure 2:
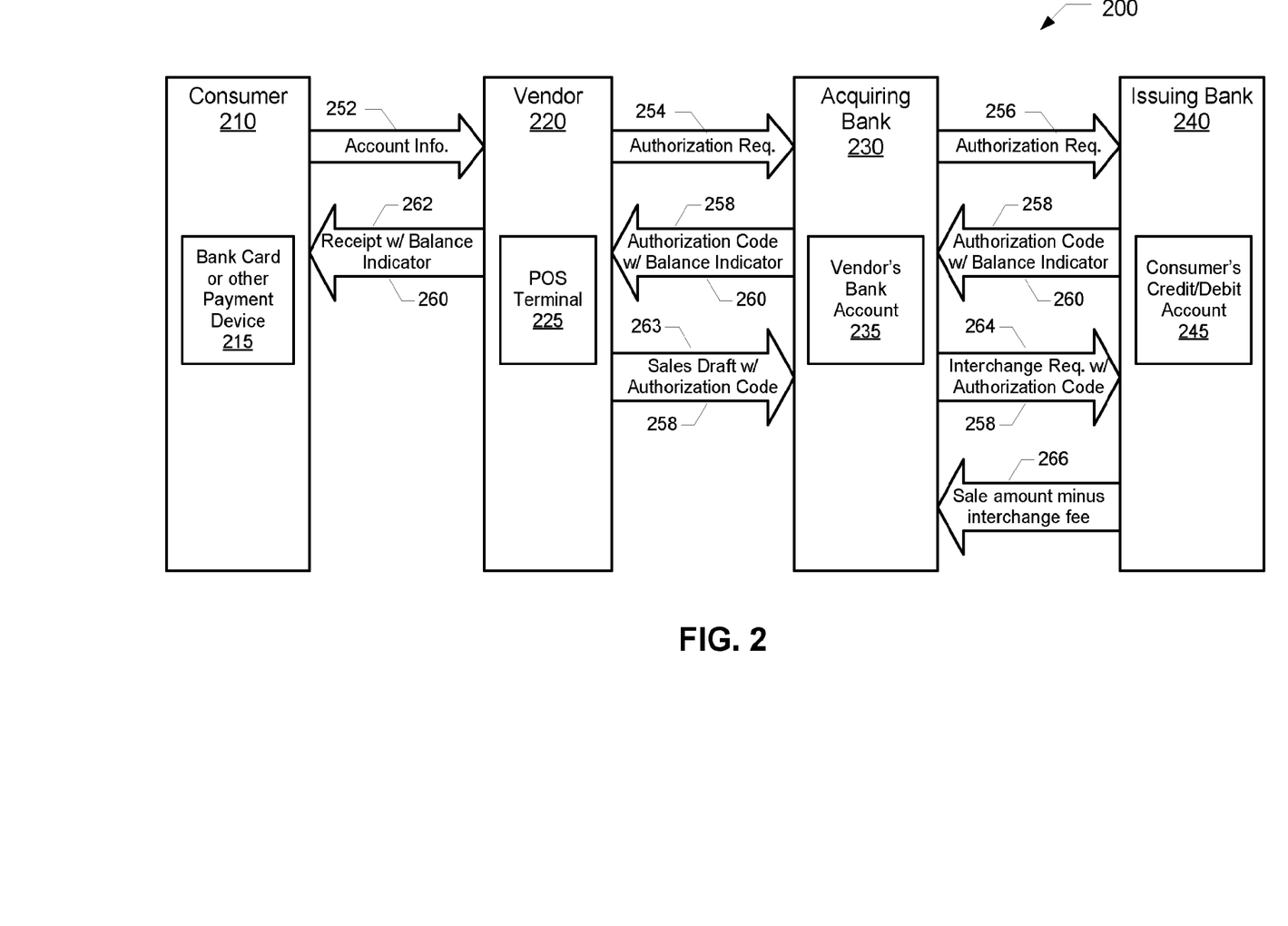
FIG. 2 is a block diagram providing a more detailed illustration of a balance indicating system, in accordance with one embodiment of the present invention.

FIG. 2 is a block diagram providing a more detailed illustration of a balance indicating system 200, in accordance with one embodiment of the invention. In general, the balance indicating system 200 includes a consumer 210, a vendor 220, an acquiring bank 230, and an issuing bank 240. As illustrated in FIG. 2, in one embodiment, the consumer 210 has a bank card or other payment device 215 that is used by the consumer 210 to make transactions involving the consumer's bank account 245 maintained by the issuing bank 240. As described above, as used herein the phrases "bank card" and "bank account" may refer to a credit or debit card, and a credit or debit account, respectively.

When the consumer 210 decides to make a transaction, such as a payment transaction to pay for a product provided by the vendor 220, or a return transaction returning a product to the vendor 220, the consumer 210 provides the vendor 220 with account information 252 that can be used to identify the consumer's bank account 245. In the illustrated embodiment, the consumer 210 uses a payment device 215 to provide account information 252 to the vendor 220. Accordingly, the vendor 220 has a point-of-sale (POS) terminal 225 or other device that is configured to receive account information 252 from the payment device 215, or otherwise from the consumer 210, and use the account information 252 to request electronic authorization of the transaction.

For example, in one embodiment, the payment device 215 comprises a bank card having a magnetic strip encoded with account information 252 that the vendor 220 and/or the vendor's acquiring bank 230 can use to identify the issuing bank 240 and the consumer's bank account 245 with the issuing bank 240. More specifically, suppose that a consumer wishes to purchase a particular product from the vendor 220. A purchase amount may be determined by, for example, scanning a barcode associated with the product to be purchased. In one exemplary embodiment, the consumer 210 begins the payment process by swiping the magnetic strip on a bank card 215 across a magnetic reader of a POS terminal 225. The POS terminal 225 reads the magnetic strip and obtains account information 252 that can be used to identify the consumer's issuing bank 240 and bank account 245.

In other embodiments, the payment device 215 may include another form of machine-readable medium having machine-readable code embodied therein that holds information about the consumer's bank account 245. Accordingly, in such other embodiments, the vendor's POS terminal 225 has a machine-readable code reader that is configured to read the machine-readable medium and the machine-readable code embodied therein to determine the consumer's account information 252 therefrom. For example, in one embodiment, the payment device 215 includes a radio frequency (RF) transmitter that transmits an RF signal encoded with account information 252. In such an embodiment, the POS terminal 225, includes an RF receiver that receives the RF signal and decodes the signal to determine the account information 252.

In still other embodiments, the payment device 215 may comprise the consumer's mobile telephone or other mobile computing device having wireless capabilities, such as Bluetooth capabilities, and configured to transmit the consumer's account information 252 to a nearby POS terminal 225 using the wireless capabilities. In still other embodiments, the payment device 215 includes a one- or two-dimensional barcode and the POS terminal 225 includes a barcode reader. In still other embodiments, the payment device 215 can be electrically coupled to the POS terminal 225 to communicate account information 252 from the payment device 215 to the POS terminal 225. In still other embodiments, the payment device 215 includes alphanumeric characters that are entered into a POS terminal 225 (which may be a consumer's computer device, if the consumer is making an online purchase) manually by the consumer 210 or the vendor 220 or automatically using an imaging device and character recognition software.

As illustrated in FIG. 2, once the vendor 220 receives the account information 252 from the consumer 210, the vendor 220 communicates an authorization request 254 to the issuing bank 240 via an acquiring bank 230. The acquiring bank 230 is generally the financial institution that maintains the vendor's bank account 235 to which the consumer's payment will be deposited in a purchase transaction (or from which a consumer's refund will be withdrawn in a return/refund transaction).

The authorization request 254 includes a request to the issuing bank 240 to approve the transaction and/or the transaction amount. As such, the authorization request 254 generally comprises the consumer's account information 252 and the transaction amount. In some embodiments, the authorization request 254 also includes information about the vendor 220, such as information identifying the particular vendor or the type of vendor, and/or information about a product or service involved in the transaction, such as information identifying the particular product/service or the type of product/service. For example, in one embodiment, the authorization request includes a merchant category code (MCC) and/or one or more universal product codes (UPCs).

The authorization request 254 is generally communicated from the POS terminal 225 to the acquiring bank 230 electronically, via a network. In one embodiment, the network comprises a telephonic network, the Internet, or both. In this regard, the POS terminal 225 generally comprises a processing device, a memory device, and a network communication device. The account information 252 and other transaction information may be temporarily stored in the POS terminal's memory device and then communicated over the network by the POS terminal's processing device using the terminal's network communication device. In some embodiments, the authorization request 254 is communicated from the vendor 220 to the acquiring bank 230 through one or more other institutions, such as an inventory monitoring system for the vendor or other payment processing institutions or networks.

As further illustrated in FIG. 2, the acquiring bank 230 receives the authorization request 254 and communicates an authorization request 256 to the issuing bank 240 via a network. In this regard, the acquiring bank 230 generally comprises a network communication device, a processing device, and a memory device for receiving, storing, and sending the authorization request 256 and/or other information about the transaction. The network may comprise a telephonic network, the Internet, and/or some other network or combination of networks.

The authorization request 256 sent by the acquiring bank 230 is generally the same or similar to the authorization request 254 sent by the vendor 220, although one authorization request may have a different form and/or contain more or less information about the transaction, the consumer, the vendor, or the acquiring bank than the other authorization request. In one embodiment, the authorization request 256 is communicated from the acquiring bank 230 to the issuing bank 240 via one or more other institutions, such as a card association, a payment network, or other payment processor. In still other embodiments, the authorization request 254 is communicated directly from the vendor 220 to the issuing bank 240.

The issuing bank 240 receives the authorization request 256 and determines whether to authorize the requested transaction. For example, where the transaction includes a purchase, the issuing bank 240 may compare the purchase amount to the available funds or credit in the consumer's bank account 245 and authorize the transaction based at least partially on whether there are sufficient funds/credit in the consumer's bank account 245 to cover the purchase amount. In some embodiments, the issuing bank 240 may also look at other transaction information, such as vendor and/or product information, to determine any irregularities that may lead the issuing bank 240 to suspect fraud, in which case the issuing bank 240 may choose not to authorize the transaction.

If the issuing bank 240 authorizes the transaction, the issuing bank 240 responds to the authorization request 256 with an authorization communication. The authorization communication comprises an authorization code 258 and a balance indicator 260. The authorization code 258 generally comprises a numeric or alphanumeric code that is used to convey the issuing bank's authorization of the transaction and may be used to identify the particular transaction in future correspondence with the issuing bank 240. As described above, the balance indicator 260 indicates the balance of the consumer's bank account 245 and/or other information about the balance of the consumer's bank account 245.

For example, in one embodiment, the balance indicator 260 provides a number that represents the dollar amount of the funds remaining in the consumer's deposit account after the purchase amount is debited from the account. In another embodiment, the balance indicator 260 provides a number that represents the dollar amount of the total balance currently maintained on the consumer's credit account after the purchase amount has been added. In another embodiment, the balance indicator 260 provides a number that represents the dollar amount of the available credit remaining in the consumer's credit account after the purchase amount has been added (e.g., the available credit being, in one embodiment, the credit limit minus the current balance minus the purchase amount). In some embodiments, the balance indicator 260 indicates other information about the balance, such as a number representing the dollar amount of purchases made during the current payment cycle, since the last statement, during the current month, during the current year, over a defined period of time, or the like.

In some embodiments, the issuing bank 240 uses transaction information received in the authorization request 256, such as vendor information and/or product information, to determine other information about the balance, such as the amount that the consumer has spent on a certain type of product or vendor during the current cycle (referred to herein as the "cycle-to-date balance") or over a defined period of time (referred to herein as a "period-to-date balance"). For example, in one embodiment, the authorization request 256 may indicate that the transaction takes place at a gas station and/or that the transaction or a portion thereof involves the purchase of gas. In such an embodiment, the balance indicator 260 may then include on the consumer's gas receipt a number representing the amount that the consumer has spent on gas so far during the current month. This additional information about the balance may be provided in addition to or as an alternative to the actual total balance of the consumer's account 245.

If the issuing bank 240 does not approve the transaction, the issuing bank 240 may send a denial code in the authorization communication, the denial code indicating to the vendor 220 that the consumer's transaction has been denied. In one embodiment, the issuing bank 240 still sends a balance indicator 260 with a denial code, except that the issuing bank 240 may not subtract the amount of the attempted transaction from the total balance before the attempted transaction.

As described in greater detail below, whether the issuing bank 240 includes a balance indicator 260 in the authorization communication is, in some embodiments, an option that the consumer 210 can choose to enroll in or not enroll in. Likewise, as also described in greater detail below, in some embodiments, the consumer 210 can choose how the balance indicator 260 is displayed on the customer's transaction receipt 262 and/or the type of balance information provided by the issuing bank 240 in the authorization communication.

In the embodiment illustrated in FIG. 2, the issuing bank 240 sends the authorization code 258 with the balance indicator 260 to the acquiring bank 230, which then forwards the authorization code 258 with the balance indicator 260 to the vendor 220. The vendor 220 then proceeds with the transaction and ultimately provides the consumer 210 with the balance indicator 260. In one embodiment, the vendor automatically provides the balance indicator 260 on the consumer's transaction receipt 262, which may be a paper or electronic receipt, along with the authorization code 258.

In a conventional payment authorization process, the authorization code 258 is often automatically provided on the consumer's receipt for the consumer 210 to later use when referencing the particular transaction with the issuing bank 240 or another party in the transaction process. As such, it should be appreciated that, in some embodiments of the invention, the balance indicator 260 can be provided to the consumer 210 without too much difficulty if the balance indicator 260 is viewed by the vendor 220 and the POS terminal 225 as merely an extension of the authorization code 258. Therefore, in one embodiment, the balance indicator 260 comprises a numeric or alphanumeric code placed immediately before or after the authorization code 258. As described in greater detail below, in some embodiments, an alphabetic, numeric, or alphanumeric code is combined with the authorization code 258 and/or the balance indicator 260 to signal to the consumer 210 where the balance indicator 260 is located in a string of alphanumeric characters, to portray to the consumer 210 the type of balance information portrayed by the balance indicator 260, and/or to camouflage the balance information from the vendor 220 or others that may have access to the authorization communication and/or the transaction receipt 262.

As further illustrated by FIG. 2, if the transaction is authorized, in addition to providing the consumer 210 with a receipt 262 and the balance indicator 260, the vendor 220, possibly at some later time, responds to the acquiring bank 230 with a sales draft 263 and the authorization code 258 indicating that the transaction with the consumer 210 has been completed. The acquiring bank 230 uses the sales draft 263 and the authorization code 258 to identify the transaction and the issuing bank 240 corresponding to the transaction. The acquiring bank 230 then sends an interchange request 264 with the authorization code 258 to the issuing bank 240. As described above, communication between the acquiring bank 230 and the issuing bank 240 may occur through a network and through one or more other financial institutions.

If the consumer transaction involved a purchase or other payment, the issuing bank 240 then withdraws the payment amount from the consumer's deposit account or adds the amount to the consumer's credit balance in a credit account, as the case may be, and then sends the payment to the acquiring bank 230 minus any interchange fee or other fee. The acquiring bank 230 then deposits the payment into the vendor's bank account 235 minus any fee charged by the acquiring bank 230.

Figure 3A:
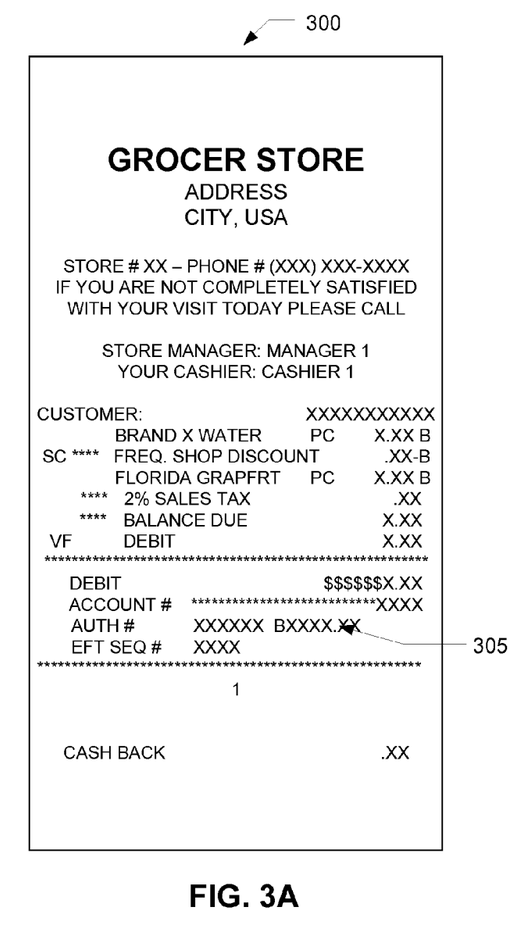
FIG. 3A illustrates a receipt issued after a debit card purchase, in accordance with one embodiment of the invention.
Figure 3B:
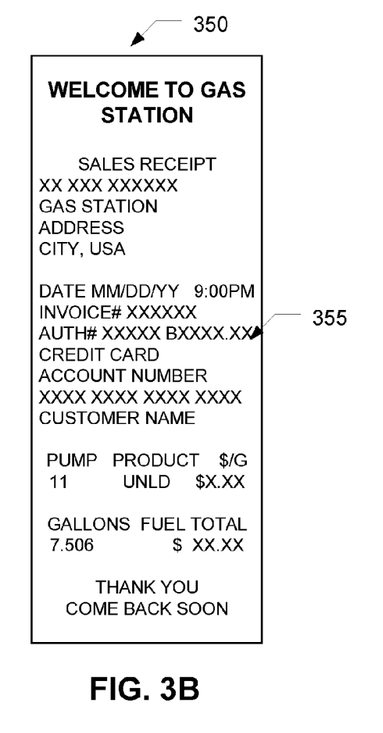
FIG. 3B illustrates a receipt issued after a credit card purchase, in accordance with one embodiment of the invention.

Referring now to FIG. 3, FIG. 3A illustrates a receipt 300 issued after a debit card purchase, in accordance with one embodiment of the invention, and FIG. 3B illustrates a receipt 350 issued after a credit card purchase, in accordance with one embodiment of the invention. In the illustrated example, the debit card receipt 300 is a receipt issued after the consumer has made several purchases at a grocery store, and the credit card receipt 350 is a receipt issued at the pump of a gas station after the consumer purchases gas using a credit card. As would be typical with a conventional bank card receipt, the receipts 300 and 350 provide information to the consumer about the transaction, such as the name and address of the vendor, the date, the last four digits of the consumer's account number, the products purchased, the cost of each product or unit thereof, the total cost, the total amount debited from the account, any cash back amount, and/or the like.

A conventional bank card receipt also typically displays the authorization code that the issuing bank returned to the vendor to indicate authorization of the transaction. In the illustrated embodiments, the authorization code is the six digit number following the "AUTH#" identifier on the receipt. In other words, the authorization code on the exemplary debit card receipt 300 is "XXXXXX" and the authorization code on the exemplary credit card receipt 350 is "XXXXXX." These are provided to the consumer so that the consumer can reference the transaction with the issuing bank if the consumer needs to do so at some later point in time. On some receipts, the authorization code may be identified on the receipt by other identifiers, such as "Ref #," "Authorization No.," "AC," "Approval Code," or the like, or may not include an identifier at all.

Unlike a conventional receipt, however, the illustrated receipts 300 and 350 include the total balance of the consumer's account after accounting for the current transaction. For example, the balance indicator 305 on the exemplary debit card receipt 300 is "BXXXX.XX," where the "B" indicates to the consumer that the number following the "B" represents the total balance of the consumer's bank account, and where the "XXXX.XX" indicates that the consumer has $X,XXX.XX in the account used to make the current purchase after the current purchase is accounted for. The balance indicator 355 on the exemplary credit card receipt 350 is "BXXXX.XX," where the "B" indicates to the consumer that the number following the "B" represents the total balance of the consumer's credit account, and where the "XXXX.XX" indicates that the consumer has $X XXX.XX owed on the consumer's credit account used to make the current purchase after the current purchase is accounted for.

As described above, in one embodiment, the issuing bank attaches the balance indicator to the authorization code so that, when the POS terminal or other vendor computing system automatically displays the authorization code on the receipt, the balance indicator is also automatically provided. In such an embodiment, the balance indicator may appear on the receipt immediately before or after the authorization code. For example, in the FIGS. 3A and 3B the balance indicators 305 and 355, respectively, immediately follow the authorization code. Such a system may be preferable since it may not require any changes to the vendor's software or computing systems and, as described below, may allow for the balance to be more easily disguised as part of the authorization code. In other embodiments, however, the balance indicator may be provided by the issuing bank separate from the authorization code and/or the balance indicator may be provided on the receipt in other locations.

Figure 4:
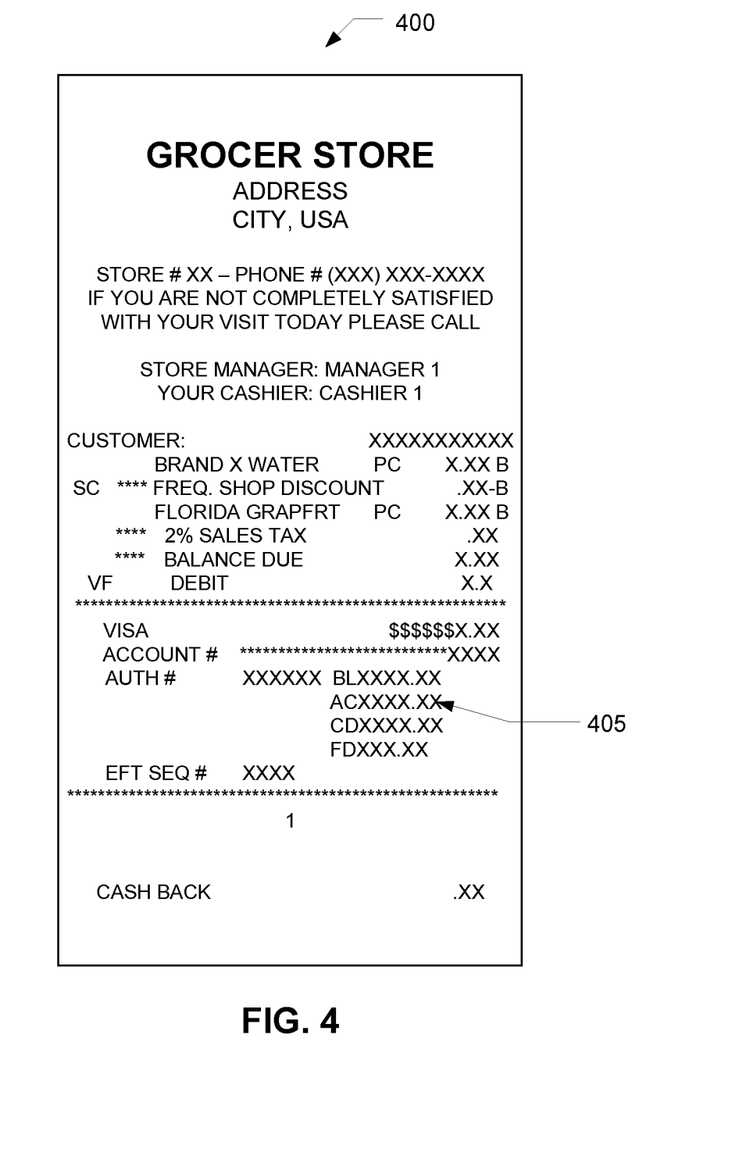
FIG. 4 illustrates a receipt issued after a credit card purchase, in accordance with another embodiment of the invention.

FIG. 4 illustrates another receipt 400 issued after a credit card purchase, in accordance with another embodiment of the invention. In the illustrated embodiment, in addition to displaying the balance of the consumer's account, the balance indicator 405 also displays other information about the consumer's balance and/or spending. For example, in the illustrated embodiment, balance indicator 405 includes four items of balance information, each identified by a two-letter identifier. The portion of the balance indicator 405 displaying "BLXXXX.XX" provides the consumer with the total balance of the account, which is, in this example, $X, XXX.XX dollars.

The portion of the balance indicator 405 displaying "ACXXXX.XX" provides the consumer with the available credit balance on the account. In the example shown in FIG. 4, the consumer used a credit card to make the purchase and the credit card has a $XX,XXX limit, so the available credit balance after this purchase is $X,XXX.XX. In one embodiment, where the bank card is a debit card and not a credit card, the available credit number in the balance indicator is the same as the balance number in the balance indicator. In other embodiments, however, if the bank card is a debit card, the issuing bank may not send an available credit number as part of the balance indicator.

The portion of the balance indicator 405 displaying "CDXXXX.XX" provides the consumer with the cycle-to-date purchase balance, which represents the total purchases made during the current cycle (i.e., the period of time since the date of the last statement, or the current month, etc.). In the example shown in FIG. 4, the consumer has spent $X,XXX.XX using this credit card during the current cycle. In other embodiments, the balance indicator 405 may be configured to show the total of all purchases made over a particular period of time using the account, such as over the past thirty days, over the past twelve months, during the year-to-date, during the current month to-date, during the current week to-date, and the like. The amounts shown in the cycle-to-date balance or a period-to-date balance includes, in one embodiment, both purchases and cash withdrawals.

In some embodiments, the balance indicator 405 includes cycle-to-date or period-to-date purchases in a specific category, where the category is based, for example, on the product purchases, the type of product purchased, the vendor, the type of vendor, the type of transaction (withdrawal, purchase, return, refund, etc.), and/or the like. In the exemplary embodiment of FIG. 4, the portion of the balance indicator 405 displaying "FDXXX.XX" provides the consumer with the cycle-to-date food purchase balance, which is the total food-related purchases made during the current cycle using this credit card and/or credit account. In the example shown in FIG. 4, the consumer has spent $X,XXX.XX using this credit account during the current cycle. In one embodiment, the balance indicator includes a list of default or consumer-selected category balances on every receipt, while in other embodiments, the balance indicator includes only those categories related to the current purchase. For example, in one embodiment, if the issuing bank receives information about the vendor (e.g., a MCC) or the products (e.g., a UPC) involved in the current transaction, the issuing bank decides which category balance indicators to provide based at least partially on the information about the vendor and/or the information about the products. In the example illustrated in FIG. 4 where the vendor is a grocer, the issuing bank provides the cycle-to-date food purchase balance since the issuing bank assumes that the purchases are food related, since the vendor is a grocer. Other product/vendor categories may include, but are not limited to, gas, clothes, office supplies, home furnishings, home improvement products, medical expenses, online purchases, bills, electronics, a particular vendor, and/or the like.

In one embodiment, the cycle-to-date, period-to-date, and/or category-specific balances are based on the transactions made on the bank account, while in other embodiments, these balances are specific to each card or payment device that is associated with the account. For example, where two different people, such as members of the same family, each have a bank card tied to the same bank account, a balance indicator on a receipt where a first bank card was used during the transaction may show the cycle-to-date balance of the purchases made only with the first bank card. This balance indicator may be displayed on the receipt in addition to or as alternative to the cycle-to-date balance for the entire account. Such an embodiment may be useful, for example, where a teenager has a bank card that draws on the parents' bank account and has a monthly allowance, such as a gas allowance, that the teenager should not exceed. In such an example, the teenager can use the balance indicator to track, after each gas purchase, how much the teenager has spent on gas during the current cycle or month so that the teenager can try not to exceed the allowance for the cycle.

As illustrated in FIGS. 3 and 4, in some embodiments, the balance indicator includes a prefix that can help the consumer distinguish the balance indicator from other numbers on the receipt, such as the authorization code, and to signal to the consumer what the balance indicator pertains to, if it pertains to balance information other than the total account balance. In one embodiment, the prefixes are determined by the issuing bank, but in other embodiments the prefixes are determined by the consumer. Furthermore, in some embodiments, the consumer may be able to specify suffixes or roots (characters in the middle of the balance number) in addition to or as an alternative to prefixes. For example, the consumer may be able to log into the consumer's account on the issuing bank's website and create customized alphabetic, numeric, alphanumeric, or other character prefixes, suffixes, and roots within certain limits (such as the number of character limits and/or type of character limits) specified by the issuing bank. Such embodiments may allow the consumer to more easily identify the information in the balance indicator and/or may allow the consumer to disguise the balance indicators on the receipt so that others viewing the receipt or receiving the authorization communication form the issuing bank cannot easily determine the consumer's balance information.

Figure 5:
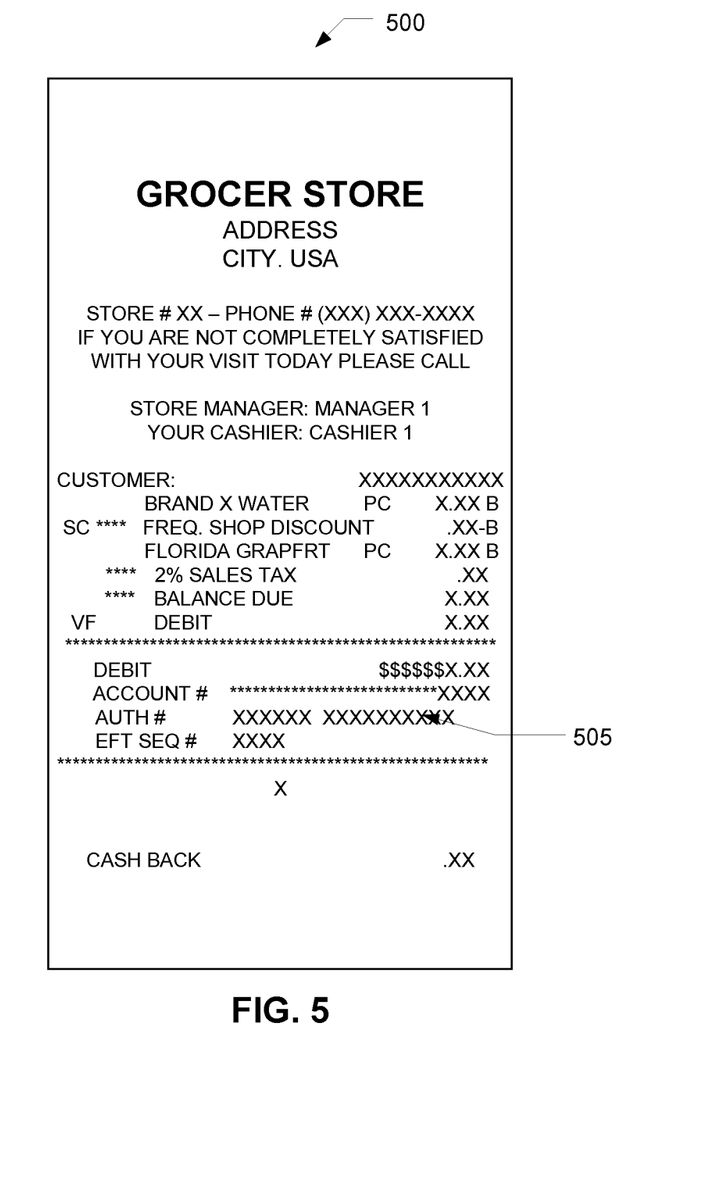
FIG. 5 illustrates a receipt issued after a bank card purchase, in accordance with yet another embodiment of the invention.

For example, FIG. 5 illustrates a receipt 500 issued after a bank card purchase, in accordance with yet another embodiment of the invention where the consumer has disguised the balance information by making customized changes to the balance indicator 505. In the illustrated embodiment, the balance indicator 505 displays a balance of $XXXX.XX. However, an "XXXX" has been placed before the balance and the decimal point has been removed. For example, in one embodiment, the consumer requested may have requested that an "XXXX" be included as a prefix so that the consumer will know that the number following the "XXXX" represents the account balance with the decimal point before the last two numbers removed. In another embodiment, the consumer may have requested that the balance be, for example, the number following a randomly generated four-character prefix. It can be seen in FIG. 5, that such customized changes to the balance indicator 505 can hide the balance information from other persons viewing the receipt, while still allowing the consumer to identify the balance information. Any number of other customized changes may be made to the balance indicator to hide the information in a manner that the consumer can still identify the information, and such customized changes will be apparent to one of ordinary skill in the art in view of this disclosure.

Figure 6:
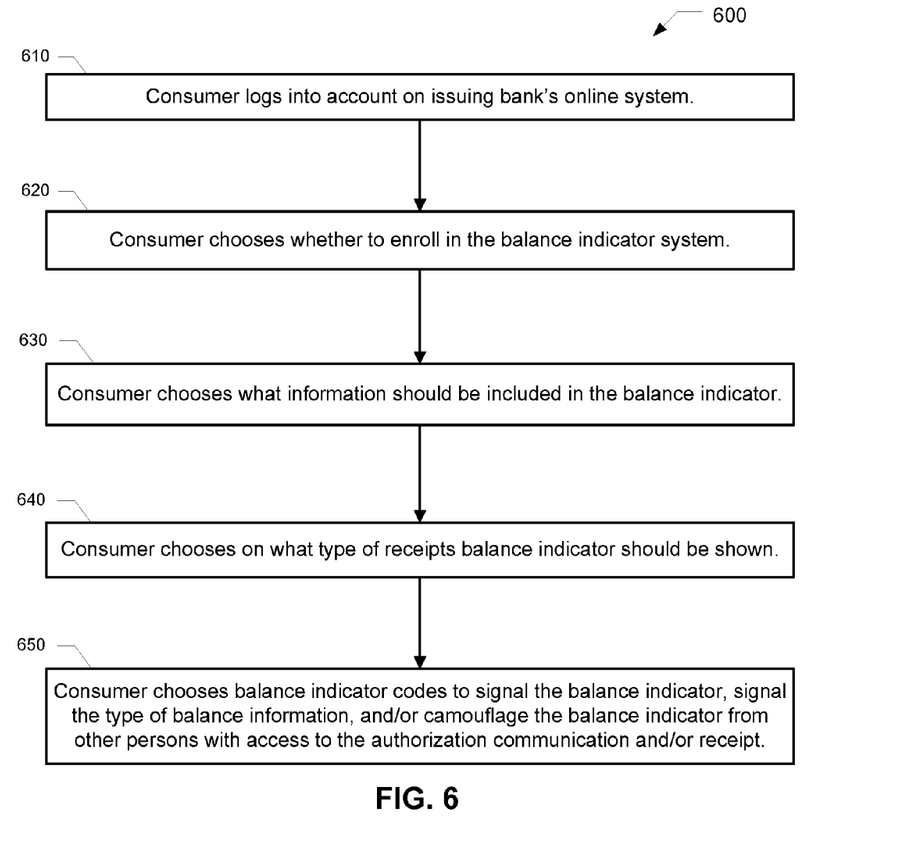
FIG. 6 is a flow diagram illustrating a procedure for receiving consumer consent and input for the balance indicator program, in accordance with one embodiment of the invention.

In some embodiments, the balance indicator program is an optional feature of an account that the consumer must choose to opt into. The consumer may be able to opt into the feature and/or customize the feature online, via a telephone, at a branch of the issuing bank, at an automated teller machine (ATM) or other kiosk, and/or the like. For example, FIG. 6 provides a flow diagram illustrating a procedure 600 for receiving consumer consent and input for the balance indicator program, in accordance with one embodiment of the invention. In the illustrated embodiment, as represented by block 610, the consumer logs into the consumer's account on the issuing bank's online system. In one embodiment, the consumer may log on from the consumer's personal computer and using the Internet. In other embodiments, the consumer may log on from a mobile terminal, such as a mobile phone, an ATM, a kiosk at a branch location, or the like.

As represented by block 620, once logged into the consumer's account, the consumer chooses whether to enroll in the balance indicator system. The consumer may also be able to customize the balance information included in the balance indicator. For example, as represented by block 630, the consumer may be able to choose what information should be included in the balance indicator. In this regard, the consumer may be able to choose to display, for example, the total balance, the available credit balance (if the bank card is a credit card), the cycle-to-date balance, a period-to-date balance, one or more category balances that may also be cycle-to-date or period-to-date balances, and/or the like.

As represented by block 640, the consumer may also be able to choose the type of receipts on which the balance indicator should be shown and/or the types of transactions for which balance information should be sent by the issuing bank. In one embodiment, the issuing bank receives vendor information and/or product information for a transaction when the issuing bank receives the authorization request, and the issuing bank can then distinguish between different transactions based on, for example, the type of vendor or product involved in the transaction. In such an embodiment, the consumer may choose to only have certain balance information sent by the issuing bank and/or displayed on the transaction receipt for certain types of transactions. For example, the consumer may choose to not have balance information displayed on a receipt at a restaurant where someone other than the consumer, such as a waiter, typically has access to the consumer's receipt for some length of time.

As represented by block 650, the consumer may also be able to choose balance indicator codes to signal the balance indicator, signal the type of balance information, and/or disguise the balance indicator from other persons with access to the authorization communication and/or receipt. As described above, in one embodiment, the consumer can create customized prefixes, suffixes, and/or roots to add to the balance indicator to disguise the balance information. These prefixes, suffixes, and/or roots may include any character string, alphabetic string, alphanumeric string, and/or numeric string. In some embodiments, the consumer can create other types of rules for systematically altering the balance information, such as requesting a random number of a defined number of digits be added to the beginning or end of each balance number, removing the decimal point, listing the number in reverse order, etc. In other embodiments, the consumer selects from a list of rules, prefixes, suffixes, and/or roots made available by the issuing bank.

Figure 7:
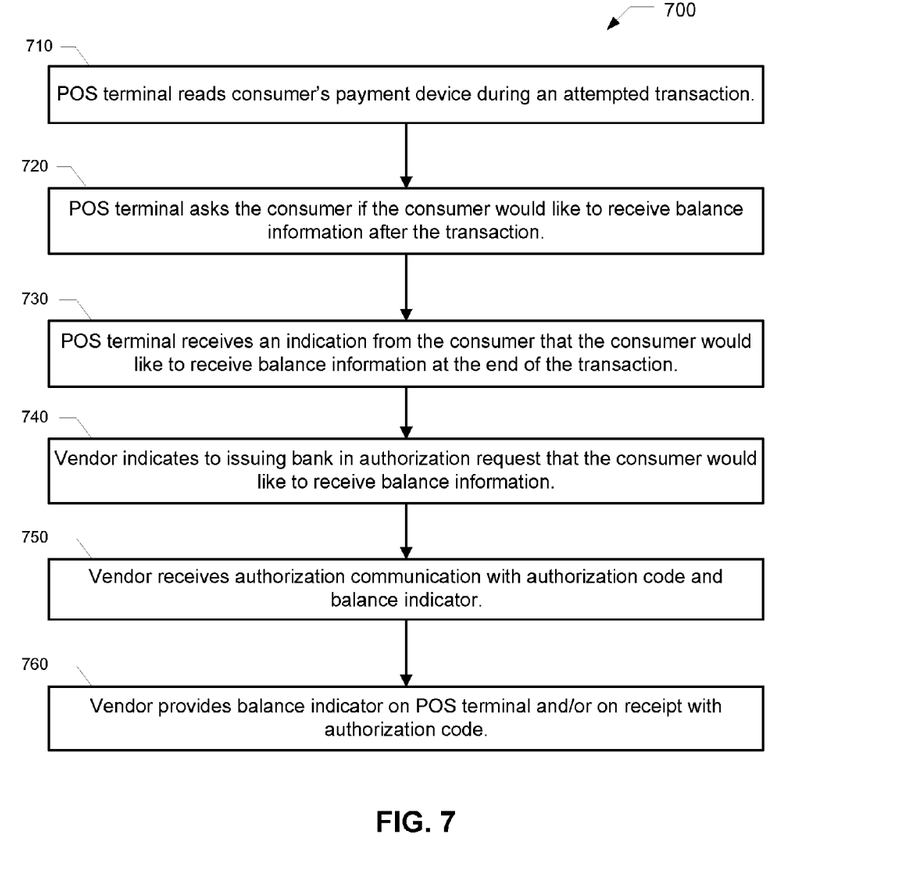
FIG. 7 is a flow diagram illustrating a procedure for receiving consumer consent for the balance indicator program, in accordance with another embodiment of the invention.

In some embodiments of the present invention, the consumer chooses whether or not to receive balance information on a receipt by making a decision during the transaction. For example, FIG. 7 is a flow diagram illustrating a procedure 700 for receiving consumer consent for the balance indicator program, in accordance with another embodiment of the invention. As represented by block 710, the POS terminal obtains account information from the consumer's payment device during an attempted transaction. As represented by block 720, the POS terminal then asks the consumer if the consumer would like to receive balance information after the transaction. For example, in one embodiment, the POS terminal includes a display for displaying the option to the consumer and a user input device, such as a keypad or touch screen, for allowing the consumer to communicate a decision to the POS terminal. For example, the POS terminal may make this inquiry after the consumer swipes a bank card and/or before or after the consumer enters a personal identification number (PIN).

As represented by block 730, the POS terminal may then receive an indication from the consumer that the consumer would like to receive balance information at the end of the transaction. If so, then, as represented by block 740, the vendor indicates to the issuing bank in an authorization request that the consumer would like to receive balance information. The issuing bank then sends an authorization communication including a balance indicator, which is then received by the vendor, as represented by block 750. As represented by block 760, the vendor then provides the consumer with the balance indicator by, for example, displaying the balance indicator on the POS terminal and/or on the transaction receipt along with, in some embodiments, the authorization code.

In the embodiment described above in FIG. 7, the POS terminal obtains the consumer's request to receive a balance indicator prior to requesting authorization from the issuing bank, so that the issuing bank will not send the balance information over the payment network if the consumer does not want it. In other embodiments, however, the issuing bank always sends the balance information of an enrolled consumer and the POS terminal decides whether to print the information on the receipt or otherwise display the information to the consumer based on the consumer's response regarding whether the consumer wants the balance information or not. In some embodiments, the procedure of FIG. 6 may be combined with the procedure of FIG. 7 so that the consumer customizes and/or opts into or out of the balance indicator program online, but also, if enrolled in the program, is asked at the point of sale if he or she desires to receive a balance indicator.

It should be appreciated that, as described above, some embodiments of the present invention are configured such that balance indicators can be provided to a consumer using a conventional bank card payment system without substantial changes to the system other than at the issuing bank, where software and/or hardware for determining balance information and communicating balance information with an authorization communication may be needed. In other embodiments, however, such as embodiments represented by FIG. 7, where a POS terminal prompts the consumer during the transaction to choose whether a balance indicator should be communicated by the issuing bank and/or displayed on the receipt, software and/or hardware modifications may be needed at the POS terminal or at other participants locations in the transaction process to perform the functions described above. Such software modifications and/or hardware modifications will be apparent to one of ordinary skill in the art in view of this disclosure.

As will be appreciated by one of skill in the art, the present invention may be embodied as a method, system (including an apparatus), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, platform, apparatus, or device. The computer-readable instructions may be transmitted using any appropriate medium, including but not limited to the Internet, wireline, optical fiber cable, radio frequency (RF), or the like.

Computer-readable instructions for carrying out operations of the present invention may be written in an objectoriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products according to embodiments of the invention. It will be understood that each block of the flowchart illustrations and/or block diagrams shown in FIGS. 1, 2, 6, and 7, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

For example, in one embodiment, the issuing bank illustrated in FIG. 2 comprises a processing system, a memory system comprising computer-readable medium, and a network communication device for communicating with the other entities involved in the balance indicating/transaction process. In addition to including datastores of information about the consumer's account and the consumer's balance indicator preferences, the memory system of the issuing bank also generally includes computer program code comprising computer-readable instructions for instructing the processor to execute such procedures as: receiving an authorization request, determining balance information about a consumer's account based on consumer preferences, communicating a balance indicator along with an authorization code, and/or other functions described above as being, at least in some embodiments, performed by the issuing bank.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving, by an acquiring financial institution processing device from a point of sale terminal of a vendor, an authorization request initiated in response to a transaction request from a payment device of a consumer, the authorization request comprising a request to authorize a transaction involving a credit account maintained by an issuing financial institution and owned by the consumer, wherein the vendor is not affiliated with the issuing financial institution; and
said processing device:
sending the authorization request to the issuing financial institution;
receiving an authorization code for identifying the transaction and comprising a balance indicator from the issuing financial institution, wherein the balance indicator comprises information about the credit account comprising of a cycle-to-date purchase balance in a specific category, wherein the specific category comprises one of a type of product purchased, a vendor, a type of vendor or a type of transaction;
responding to the authorization request from the point of sale terminal with an authorization communication comprising the authorization code and the balance indicator such that the balance indicator can be displayed on a display operatively connected with the point of sale terminal;
receiving a sales communication from the point of sale of the vendor, the sales communication comprising a sales draft and the authorization code and indicating that the transaction has been completed;
sending an interchange request comprising the authorization code to the issuing financial institution;
receiving a payment from the issuing financial institution based on a transaction amount associated with the transaction minus an interchange amount; and
depositing the payment into an account maintained by the acquiring financial institution and owned by the vendor.

2. The method of claim 1, wherein the transaction comprises a purchase of goods or services where payment for the goods or services is to come from the credit account.

3. The method of claim 1, wherein the balance indicator further comprises a number representing a total balance of the credit account.

4. The method of claim 1, wherein the balance indicator further comprises a number representing an available credit in the credit account.

5. The method of claim 4, wherein the number represents the available credit after the transaction occurs.

6. The method of claim 1, wherein the balance indicator is attached to the end of the authorization code.

7. The method of claim 1, wherein the balance indicator is combined with the authorization code in such a way that a point-of-sale terminal configured to automatically display an authorization code will automatically display the balance indicator with the authorization code.

8. The method of claim 7, wherein the point-of-sale terminal is configured to automatically display an authorization code on a printed receipt.

9. The method of claim 1, wherein the balance indicator comprises balance information disguised by a rule selected by a person associated with the bank account.

10. The method of claim 1, wherein the balance indicator comprises a code attached to balance information, said code signaling to a user the presence of or type of balance information.

11. The method of claim 1, further comprising: said processing device receiving an indication from a person associated with the bank account that the issuing bank should communicate the balance indicator with the authorization communication.

12. A method comprising:
communicating, by a processing device at a point of sale terminal of a vendor, an authorization request requesting approval of a transaction comprising a purchase of a good or service, the authorization request comprising account information and transaction information, initiated in response to a transaction request from a payment device of a consumer, through an acquiring financial institution and to an issuing financial institution, wherein said account information comprises information about a consumer's credit account to be used during the transaction and maintained by the issuing financial institution, and wherein said transaction information comprises information about the purchase, wherein the vendor is not affiliated with the issuing financial institution;
in response to communicating said authorization request, said processing device receiving, at the point of sale terminal, through the acquiring financial institution from the issuing financial institution, an authorization code identifying the transaction and comprising a balance indicator comprising information about the credit account comprising of a cycle-to-date purchase balance in a specific category, wherein the specific category comprises one of a type of product purchased, a vendor, a type of vendor or a type of transaction;
in response to receiving the balance indicator, said processing device presenting the balance indicator to the consumer on a display operatively connected with the point of sale terminal; and
sending a sales communication comprising a sales draft and the authorization code, the sales communication indicating that the transaction has been completed.

13. The method of claim 12, further comprising: said processing device printing the balance indicator on the consumer's receipt.

14. The method of claim 12, further comprising:
said processing device receiving the account information from the consumer's payment device.

15. The method of claim 12, wherein the consumer's payment device comprises a credit card.

16. The method of claim 12, wherein the balance indicator is attached to the end of the authorization code.

17. The method of claim 12, further comprising: said processing device presenting the balance indicator to the consumer as part of the authorization code.

18. The method of claim 12, further comprising: said processing device asking the consumer if the consumer would like to receive the balance indicator.

19. A system comprising:
an issuing financial institution communication device configured to receive an authorization request from a point of sale terminal of a vendor through an acquiring financial institution, said authorization request initiated in response to a transaction request from a payment device of a consumer, the authorization request comprising a request to authorize a purchase involving a credit account, wherein the vendor is not affiliated with the issuing financial institution;
an issuing financial institution processing device operatively coupled to the communication device and configured to use the communication device to respond to the authorization request from the point of sale terminal with an authorization communication through the acquiring financial institution, said authorization communication comprising an authorization code for identifying the transaction and a balance indicator comprising information about the credit account comprising of a cycle-to-date purchase balance in a specific category, wherein the specific category comprises one of a type of product purchased, a vendor, a type of vendor or a type of transaction;
said communication device further configured to receive an interchange request comprising the authorization code from the acquiring financial institution, the interchange request indicating that the transaction has been completed with the consumer; and
said processing device further configured to use the communication device to respond to the interchange request from the acquiring financial institution with a payment based on a transaction amount associated with the transaction minus an interchange amount for deposit into an account maintained by the acquiring financial institution and owned by the vendor such that the balance indicator can be displayed on a display operatively connected with the point of sale terminal.

20. The system of claim 19, wherein the authorization communication comprises an indication of the credit account's total balance.

21. The system of claim 20, wherein the authorization code is attached to the indication of the credit account's total balance.

22. The system of claim 20, wherein the indication of the credit account's total balance is disguised based on a rule.

23. The system of claim 22, further comprising:
a user input system configured to receive user input from a user, wherein the rule is based at least partially on user input, and wherein the user is associated with the credit account.

24. The system of claim 19, wherein the authorization code comprises an indication of an available credit.

25. The system of claim 19, further comprising:
a user input system configured to receive an indication from a user regarding whether the user desires to receive the balance indicator.

26. The system of claim 19, wherein the authorization request comprises an indication regarding whether the user desires to receive the balance indicator.

27. A computer program product comprising a non-transitory computer-readable medium, said computer-readable medium comprising computer-readable instructions, said instructions comprising:
instructions for receiving, by an acquiring financial institution from a point of sale terminal of a vendor, an authorization request initiated in response to a transaction request from a payment device of a consumer, the authorization request comprising a request to authorize a transaction involving a credit account maintained by an issuing financial institution and owned by the consumer, wherein the vendor is not affiliated with the issuing financial institution;

instructions for sending the authorization request to the issuing financial institution;

instructions for receiving an authorization code identifying the transaction and comprising a balance indicator from the issuing financial institution, wherein the balance indicator comprises information about the credit account comprising a cycle-to-date purchase balance in a specific category, wherein the specific category comprises one of a type of product purchased, a vendor, a type of vendor or a type of transaction;

instructions for responding to the authorization request from the point of sale terminal with an authorization communication comprising the authorization code and the balance indicator such that the balance indicator can be displayed on a display operatively connected with the point of sale terminal;

instructions for receiving a sales communication from the point of sale of the vendor, the sales communication comprising a sales draft and the authorization code and indicating that the transaction has been completed;

instructions for sending an interchange request comprising the authorization code to the issuing financial institution;

instructions for receiving a payment from the issuing financial institution based on a transaction amount associated with the transaction minus an interchange amount; and instructions for depositing the payment into an account maintained by the acquiring financial institution and owned by the vendor.

28. The computer program product of claim 27, wherein the transaction comprises a purchase of goods or services where payment for the goods or services is to come from the credit account.

29. The computer program product of claim 27, wherein the balance indicator further comprises a number representing an available credit that will be in the credit account after the transaction occurs.

30. The computer program product of claim 27, wherein the balance indicator is attached to the end of the authorization code.

31. The computer program product of claim 27, further comprising: instructions for disguising balance information in the balance indicator by applying a rule selected by a person associated with the credit account.

\* \* \* \* \*